Dec. 15, 1959   R. A. GRINDSTAFF   2,916,845
FISHING BAIT HOLDER
Filed Jan. 31, 1958

INVENTOR.
Ray A. Grindstaff
BY

United States Patent Office 2,916,845
Patented Dec. 15, 1959

2,916,845

FISHING BAIT HOLDER

Ray A. Grindstaff, Spokane, Wash.

Application January 31, 1958, Serial No. 712,427

3 Claims. (Cl. 43—4)

This invention is a fishing bait holder for live bait.

The present invention relates to sporting goods, and more particularly to a fishing bait holder for live bait.

During cold weather, fishermen usually find it difficult to bait their hooks with worms and like live bait because their hands are cold and they are unable to manipulate the fingers with dexterity while the live bait by its movements further hinders the baiting operation. The present invention successfully provides means for holding the live bait so that the process of baiting the hook is easily accomplished.

In the accompanying drawings I have shown two species of fishing bait holders, each of which functions in a similar manner and effectively embodies the invention constituting the subject matter of this application.

In the drawings, wherein like numerals are employed to designate like parts:

Figure 1:
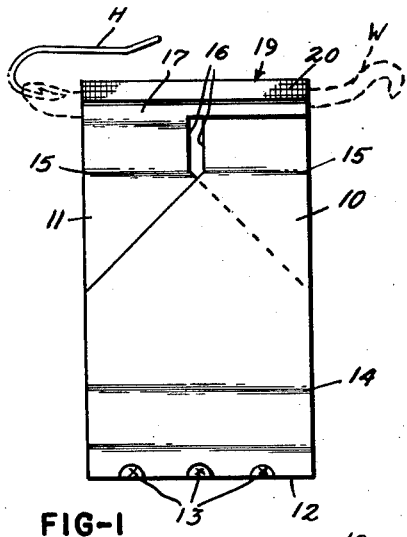
Figure 1 is an elevational view of a bait holder.

Referring now more particularly to the drawing, it will be seen in Figures 1–4 that I have provided a pincer-like device formed of sheet material having two cooperating members 10 and 11 which are spot welded or otherwise secured together at their lower edges 12 as seen at 13. From the lower edges 12 the members 10 and 11 diverge upwardly for a desired distance and then converge to a point 14 where they contact each other again to form a fulcrum. From thence they extend upwardly in divergence to the points 15 where they are bent to converge and cross each other, as seen clearly in the drawing.

Figure 2:
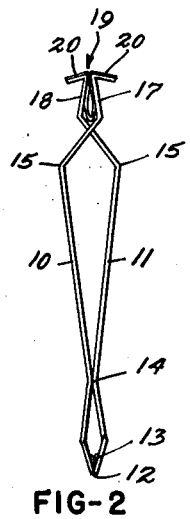
Figure 2 is an elevational view of the bait holder of Figure 1 as viewed from a position 90° from that of Figure 1.
Figure 3:
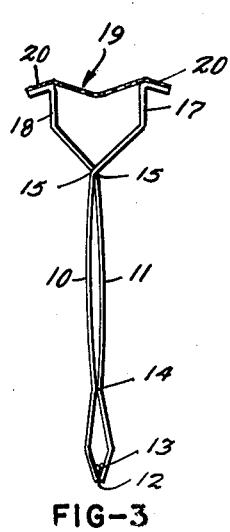
Figure 3 is a view similar to Figure 2 but with the bait holder flexed to open the mouth.
Figure 4:
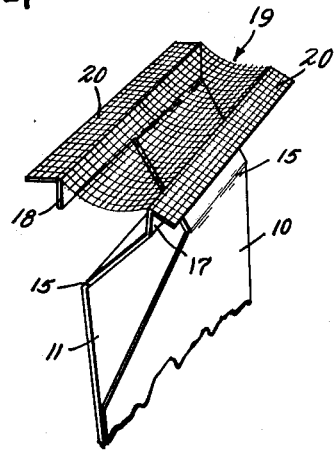
Figure 4 is a perspective view of the open mouth of the bait holder as seen in Figure 3.

To effect the crossing of each other, the members 10 and 11 are relieved at 16 for approximately ½ their widths and at opposed sides, and thence extend upwardly and outwardly to form jaws 17 and 18. It will thus be seen that the resiliency in the members 10 and 11 will maintain the jaws 17 and 18 in the closed position as seen in Figure 2, but manual pressure upon the members 10 and 11 to bring them together as seen in Figure 3 will cause separation of the jaws 17 and 18.

A deformable reticulate web 19 has its marginal edge portions adhesively secured at 20 to the jaws 17 and 18, and it will be seen that the web constitutes a mouth or receptacle into which a worm W or other fishing bait may be placed and held. The web 19 is reticulate to provide gripping surfaces and additionally is preferably formed with a coarse abrasive adhesively secured thereto so that the gripping ability of the surfaces is enhanced. It will thus be seen that the bait holder may be flexed to the position shown in Figures 3 and 4 and a worm or similar live bait may be placed on the web 19 and then manual release of the compressing pressures on members 10 and 11 will permit the jaws 17 and 18 to move to their normally closed position as seen in Figure 2 wherein the worm will be immobilized, not only by the pressure of jaws 17 and 18 but also by frictional engagement with the web 19.

The hook H may then be manipulated to apply the worm thereon, after which it may be released by compressing members 10 and 11. Obviously the amount of pressure applied on the worm may be eased by applying manual pressure to members 10 and 11.

Figure 5:
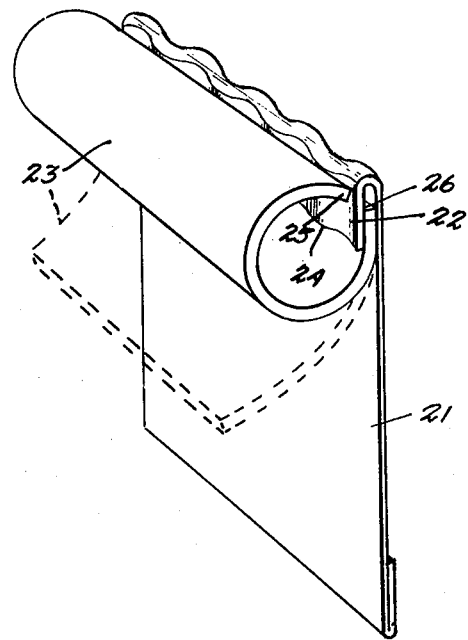
Figure 5 is a modified fishing bait holder.

In the modified form I have provided a body 21 of sheet material (preferably sheet metal) which constitutes a handle and at its upper end is folded back upon itself to form a lip 22. A deformable resilient tubular member 23 (preferably rubber) is open along its length to provide opposed longitudinal edges 25 and 26. The edge 26, it will be seen, is confined between the body 21 and the lip 22 to hold the member 23 and fix it with respect to the body 21. Since the tubular member 23, which defines a mouth, is normally in the closed full line position as shown in Figure 5, and yet is manually movable to the broken line position thereof, it is apparent that one may selectively open the mouth by deforming the member 23 to place a worm or similar live bait therein.

It will be noted that the lip 22 undulatory or corrugated laterally of the device, and this provides gripping surfaces 24 within the mouth defined by the tubular member 23, and that the frictional gripping pressure applied to the worm may be varied by varying the pressure applied by one's thumb to the deformable tubular member 23 while the worm is contained therein.

Having thus described my invention, I claim:

1. A fishing bait holder for worms and the like comprising a substantially flat body constituting a handle, a resilient deformable member of substantially tubular shape and open along its length to effect opposed longitudinal edges; and one of said edges being fixed to said body whereby the opposed edge may be manually moved to deform said member to an open position wherein a worm may be applied and held by the resiliency of said member in its normal position.

2. The invention as defined in claim 1 wherein the edge of said member fixed to said body is confined between the body and a lip formed by folding a marginal edge portion of said body back upon itself.

3. The invention as defined in claim 1 wherein the edge of said member fixed to said body is confined between the body and a lip formed by folding a marginal edge portion of said body back upon itself; and said lip being corrugated to provide frictional gripping surfaces within said tubular member.

References Cited in the file of this patent

UNITED STATES PATENTS

| D. 168,600 | Seeber | Jan. 6, 1953 |
| 740,416 | Gebhardt | Oct. 6, 1903 |
| 2,502,816 | Bennek | Apr. 4, 1950 |

FOREIGN PATENTS

| 8,409 | Great Britain | Apr. 15, 1908 |